United States Patent
Pilipenko et al.

(10) Patent No.: US 10,169,585 B1
(45) Date of Patent: Jan. 1, 2019

(54) SYSTEM AND METHODS FOR ADVANCED MALWARE DETECTION THROUGH PLACEMENT OF TRANSITION EVENTS

(71) Applicant: FireEye, Inc., Milpitas, CA (US)

(72) Inventors: Alex Pilipenko, Belmont, CA (US);
Phung-Te Ha, Dublin, CA (US)

(73) Assignee: FireEye, Inc., Milpitas, CA (US)

( * ) Notice: Subject to any disclaimer, the term of this patent is extended or adjusted under 35 U.S.C. 154(b) by 148 days.

(21) Appl. No.: 15/189,993

(22) Filed: Jun. 22, 2016

(51) Int. Cl.
*G06F 21/56* (2013.01)
*G06F 21/55* (2013.01)
*G06F 21/53* (2013.01)

(52) U.S. Cl.
CPC .......... *G06F 21/566* (2013.01); *G06F 21/554* (2013.01); *G06F 21/53* (2013.01)

(58) Field of Classification Search
None
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,878,560 A | 3/1999 | Johnson |
| 5,960,170 A | 9/1999 | Chen et al. |
| 5,978,917 A | 11/1999 | Chi |
| 5,983,348 A | 11/1999 | Ji |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf.

(Continued)

*Primary Examiner* — Malcolm Cribbs
(74) *Attorney, Agent, or Firm* — Rutan & Tucker, LLP

(57) ABSTRACT

A non-transitory storage medium including instructions that are executable by one or more processors to perform operations including instrumenting a VM is shown. The VM is used to process an object to determine whether the object is associated with malware. Logic within the VM analyzes memory allocated for a process within the VM for a point of interest (POI), the POI being an address of one of a set predetermined instructions likely to be associated with malware. The VMM detects a memory violation during processing of the object and responsive to detecting the memory violation, injects a transition event at the POI on the page on which the POI is located in memory. Further, responsive to detecting an attempted execution of the transition event, the VMM (i) emulates an instruction located at the POI, and (ii) the logic within the VM performs one or more malware detection routines.

29 Claims, 9 Drawing Sheets

(56) References Cited

U.S. PATENT DOCUMENTS

| | | |
|---|---|---|
| 6,013,455 A | 1/2000 | Bandman et al. |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |

(56) References Cited

U.S. PATENT DOCUMENTS

| | | |
|---|---|---|
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,417 B2 * | 3/2016 | Salsamendi ........... G06F 21/566 |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |

(56) References Cited

U.S. PATENT DOCUMENTS

| | | |
|---|---|---|
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0026385 A1* | 2/2006 | Dinechin ............ G06F 12/1036 711/210 |
| 2006/0031476 A1 | 2/2006 | Mathes et al. |
| 2006/0036830 A1* | 2/2006 | Dinechin ................ G06F 21/79 711/200 |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |

(56) References Cited

U.S. PATENT DOCUMENTS

| | | |
|---|---|---|
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1* | 10/2012 | Sahita .............. G06F 21/54 |
| | | 726/24 |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |

(56) References Cited

U.S. PATENT DOCUMENTS

| | | | |
|---|---|---|---|
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199531 A1 | 7/2015 | Ismael et al. |
| 2015/0220735 A1* | 8/2015 | Paithane ............... G06F 21/566 726/23 |
| 2015/0332048 A1* | 11/2015 | Mooring ............... G06F 21/567 726/1 |
| 2015/0370724 A1* | 12/2015 | Lutas .................... G06F 12/145 711/163 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0042179 A1* | 2/2016 | Weingarten ........... G06F 21/566 726/23 |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0308903 A1* | 10/2016 | Vipat ...................... G06F 21/53 |
| 2016/0335110 A1 | 11/2016 | Paithane et al. |
| 2017/0083703 A1 | 3/2017 | Abbasi et al. |
| 2017/0142134 A1* | 5/2017 | Gilbert ................... G06F 21/50 |
| 2017/0242721 A1* | 8/2017 | Tsirkin ................ G06F 9/45558 |
| 2017/0262629 A1* | 9/2017 | Xu ....................... H04L 63/1425 |
| 2018/0048660 A1 | 2/2018 | Paithane et al. |

FOREIGN PATENT DOCUMENTS

| | | |
|---|---|---|
| WO | 02/06928 A2 | 1/2002 |
| WO | 02/23805 A2 | 3/2002 |
| WO | 2007-117636 A2 | 10/2007 |
| WO | 2008/041950 A2 | 4/2008 |
| WO | 2011/053637 A1 | 5/2011 |
| WO | 2011/084431 A2 | 7/2011 |
| WO | 2011/112348 A1 | 9/2011 |
| WO | 2012/075336 A1 | 6/2012 |
| WO | 2012/100088 A1 | 7/2012 |
| WO | 2012/145066 A1 | 10/2012 |
| WO | 2013/067505 A1 | 5/2013 |
| WO | 2013/138488 A1 | 9/2013 |
| WO | 2014/018458 A2 | 1/2014 |
| WO | 2014/105949 A1 | 7/2014 |
| WO | 2014/105960 A1 | 7/2014 |
| WO | 2014/105969 A1 | 7/2014 |
| WO | 2014/106282 A1 | 7/2014 |
| WO | 2014/144111 A1 | 9/2014 |
| WO | 2014/145805 A1 | 9/2014 |
| WO | 2014/182321 A1 | 11/2014 |
| WO | 2014/209913 A1 | 12/2014 |
| WO | 2014/209914 A1 | 12/2014 |
| WO | 2015/009411 A1 | 1/2015 |
| WO | 2015/047802 A2 | 4/2015 |
| WO | 2015/047803 A1 | 4/2015 |
| WO | 2015/047804 A1 | 4/2015 |
| WO | 2015/047960 A1 | 4/2015 |
| WO | 2015/100388 A1 | 7/2015 |
| WO | 2015/200360 A1 | 12/2015 |
| WO | 2016/022717 A1 | 2/2016 |
| WO | 2016/109283 A1 | 7/2016 |
| WO | 2017/083538 A1 | 5/2017 |

OTHER PUBLICATIONS

Adetoye, Adedayo, et al., "Network Intrusion Detection & Response System", ("Adetoye"), (Sep. 2003).

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Distler, "Malware Analysis: An Introduction", SANS Institute InfoSec Reading Room, SANS Institute, (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Singh, S. , et al., "Automated Worm Fingerprinting", Proceedings of the ACM/USENIX Symposium on Operating System Design and Implementation, San Francisco, California, (Dec. 2004).

U.S. Appl. No. 13/560,415, filed Jul. 27, 2012 Non-Final Office Action dated May 21, 2014.

U.S. Appl. No. 13/560,415, filed Jul. 27, 2012 Final Office Action dated Oct. 27, 2014.

U.S. Appl. No. 13/560,415, filed Jul. 27, 2012 Non-Final Office Action dated May 5, 2015.

U.S. Appl. No. 13/560,415, filed Jul. 27, 2012 Notice of Allowance dated Oct. 14, 2015.

U.S. Appl. No. 14/602,023, filed Jan. 21, 2015 Non-Final Office Action dated Jul. 5, 2016.

U.S. Appl. No. 14/602,023, filed Jan. 21, 2015 Notice of Allowance dated Feb. 15, 2017.

U.S. Appl. No. 14/229,580, filed Mar. 28, 2014 Non-Final Office Action dated Mar. 28, 2016.

U.S. Appl. No. 14/229,580, filed Mar. 28, 2014 Notice of Allowance dated Jul. 21, 2016.

U.S. Appl. No. 14/615,798, filed Feb. 6, 2015 Non-Final Office Action dated Nov. 2, 2016.

U.S. Appl. No. 14/615,798, filed Feb. 6, 2015 Final Office Action dated May 25, 2017.

U.S. Appl. No. 14/615,798, filed Feb. 6, 2015 Advisory Action dated Aug. 31, 2017.

U.S. Appl. No. 14/615,798, filed Feb. 6, 2015 Notice of Allowance dated Feb. 8, 2018.

U.S. Appl. No. 14/962,497, filed Dec. 8, 2015 Non-Final Office Action dated May 4, 2017.

(56) References Cited

OTHER PUBLICATIONS

U.S. Appl. No. 14/962,497, filed Dec. 8, 2015 Notice of Allowance dated Nov. 21, 2017.

* cited by examiner

SYSTEM AND METHODS FOR ADVANCED MALWARE DETECTION THROUGH PLACEMENT OF TRANSITION EVENTS

FIELD

Embodiments of the disclosure relate to the field of cyber security. More specifically, embodiments of the disclosure relate to a system and method for detecting behaviors with malware by utilizing permission switching of memory pages during processing within one or more virtual machines.

GENERAL BACKGROUND

Malware detection systems often employ virtual environments to enable potentially malicious objects to be safely analyzed during run-time in one or more sandboxed virtual machines. Each virtual machine (VM) is provisioned with a guest image, where the guest image is configured in accordance with a particular software profile. This particular software profile is dependent on the type of object being analyzed. For example, where the object is an accessed web page, the software profile may prescribe a browser application that runs over a specific operating system (e.g., Windows®, Linux®, etc.). As another example, where the object is an electronic message, the software profile may prescribe an email application running over the same or a different operating system (e.g., Microsoft® Mobile®, Blackberry® OS, etc.).

For processing a suspicious object, the virtual machine is typically provisioned with a guest image that features software components for the prescribed software profile. During processing, the suspicious object may target specific sequences of instructions in order to carry out malicious behaviors. The location of these specific sequences of instructions may be referred to herein as Points of Interest (POIs) wherein a POI is a specific address at which an instruction within one of the specific sequences of instructions is located. Currently, malware detection systems running within a virtual machine may attempt to monitor execution of instructions located at POIs from within the VM; however, such monitoring is often detectable by advanced malware. When monitoring is detected by advanced malware, the advanced malware may halt or alter its instruction execution to avoid exhibiting detectable malicious behaviors in order to remain undetected or unidentified as malware. Thus, merely monitoring processing of a suspicious object using standard malware detection logic within the VM may cause a number of false-negatives. Alternatively, malware detection systems running within a virtual machine may attempt to monitor processing of a suspicious object from a virtual machine monitor (VMM) monitoring the VM; however, monitoring by a VMM may not provide the malware detection logic with sufficient information pertaining to the state of the VM and each running process within the VM to fully analyze an execution, or attempted execution, of an instruction at a POI. Therefore, in some instances, monitoring processing of a suspicious object within a VM from a VMM may result in inadequate cyber-threat information and, in some extreme cases, false-positives and/or false-negatives.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
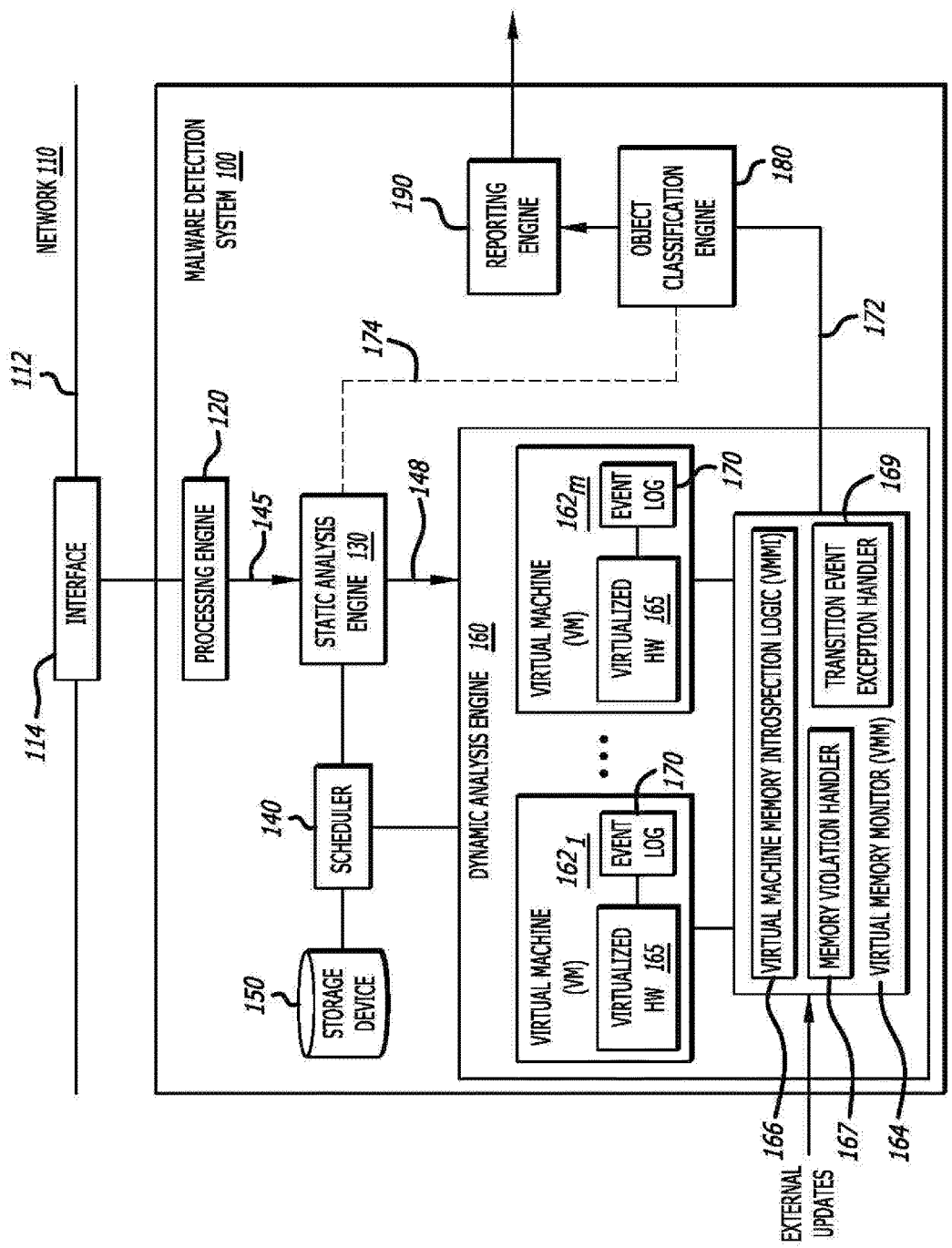
FIG. 1 is an exemplary block diagram of a malware detection system deployed with a network.

Embodiments of the invention are illustrated by way of example and not by way of limitation in the figures of the accompanying drawings, in which like references indicate similar elements and in which:

Various embodiments of the disclosure relate to a malware detection system that improves detection of malware, exploit attacks and/or suspicious/malicious behavior by performing one or more malware detection routines from within a kernel space of a virtual machine processing an object (wherein the processing is performed from the user space of the virtual machine).

In one embodiment of the disclosure, a virtual machine (VM) is instrumented by a guest kernel module (e.g., configured for one or more malware detection processes) after the VM has been created (e.g., instantiated) by a virtual machine monitor (VMM), wherein both the VM and the VMM are located within a dynamic analysis engine of a malware detection system. Initially, a guest kernel module within the VM analyzes the memory for each running application within the VM. The analysis detects one or more instructions wherein each of the one or more instructions is stored at a point of interest (POI) located within memory of each running application. As used herein, a POI is an address of an instruction or portion of an instruction in memory. For example, the POI may identify a single byte in memory, where the single byte is either a one byte instruction, or the first byte of a multiple byte instruction. More particularly, the one byte instruction or the multiple bite instruction has been predetermined as likely (i.e., having a probability above a threshold, for example, more likely than not) to be associated with malware, an exploit attack and/or suspicious/malicious behavior. Each POI is recorded in one or more data structures (e.g., a single data structure or a data structure for the memory of the corresponding running application). Upon completion of the analysis and recordation, the guest kernel module provides the VMM with the location in memory of the one or more data structures. An attempt to execute an instruction during processing of the object results in a memory violation when the instruction is located on a page in memory having a permission other than Execute.

Responsive to detecting a memory violation during processing of the object, a virtual machine monitor introspection logic (VMMI) injects a transition event into memory at each POI located on the page attempted to be accessed. Herein, the term "transition event" may refer to an interrupt that transfers control of processing from a VM to the VMM associated with the VM. In one embodiment, a transition event may be injected by altering the byte of a single byte instruction or altering the first byte of a multiple byte instruction. In a second embodiment, the original instruction located at the POI may be replaced by a different instruction. Examples of a transition event may include, but are not limited or restricted to, an interrupt (via software or hardware, such as a page fault, system management event, bus error, etc.) or a privileged instruction such that the execution of the transition event transfers control from a VM to the VMM associated with the VM. Each POI located on the page is determined by referencing the one or more data structures discussed above. Additionally, the VMMI changes the permission of the page to "execute only". Following the injection of the transition event and the change of the permission of the page, the VMMI returns control to the VM, which continues processing the object.

Responsive to detecting execution of a transition event (which results in a host-level exception), first, the processing is halted and control is transferred to the VMMI. The VMMI references the one or more data structures as discussed above to determine the original instruction at the POI that was replaced by the executed transition event and emulates the original instruction at the POI. Second, control is transferred back to the VM, now operating in kernel mode, through a guest-level exception. At that point in time, the VM performs one or more malware detection routines using the saved state of the VM immediately preceding the execution of the transition event. Upon completion of the one or more malware detection routines, the VM returns to operate in user mode and may continue to process the object.

A transition event is injected at each POI within the memory of each running application and the permission of each page is set to "execute only" in order to prevent advanced malware from determining the malware is being processed within a VM. Once advanced malware determines it is being processed within a VM, the advanced malware may forego certain anomalous or malicious behaviors in order to remain undetected by a malware detection system using the VM. Specifically, when the permission of a page in memory is set to "execute only", advanced malware cannot read from the page to detect a transition event has been placed at a POI. Therefore, advanced malware being executed within a VM will not be able to determine a transition event has been injected at a POI and will not purposely avoid execution of the POI.

Furthermore, upon execution of the POI, the state of the VM is saved and used in malware detection routines performed by logic within the kernel space of the VM. One advantage of performing malware detection routines within the VM within which an object is being processed is that the VM has access to the state of the VM. Thus, by executing a transition event, emulating the original instruction previously located at the POI and passing control to the kernel space of the VM within which the object is being processed, logic within the kernel space of the VM may perform one or more malware detection routines based on the state of the VM processing the object while remaining undetected by the advanced malware.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software to cause a network device or other portions of a network to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "processing" may include execution of a binary or launching an application wherein launching should be interpreted as placing the application in an open state and, in some implementations, performing simulations of actions typical of human interactions with the application. For example, the application, an Internet browsing application, may be processed such that the application is opened and actions such as visiting a website, scrolling the website page, and activating a link from the website are performed (e.g., the performance of simulated human interactions).

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. In one embodiment, an object may include a binary file that may be executed within a virtual machine. Herein, the terms "binary file" and "binary" will be used interchangeably.

The term "network device" may be construed as any intelligent electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated to the application during processing, and/or (vii) other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting malware and/or exploits using a permission switching technique for pages within memory allocated to a VM by injecting and removing one or more transition events and performing one or more malware detection routines on the state of the CPU and memory of the VM when a transition event is executed. As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a malware detection system (MDS) 100 deploying within a network 110 is shown. The MDS 100 comprises a processing engine 120, a static analysis engine 130, a scheduler 140, a storage device 150, a dynamic analysis engine 160, an object classification engine 180, and/or a reporting engine 190 with an optional user interface capability.

According to one embodiment, the MDS 100 is adapted to analyze received objects for malware, where a portion of the analysis is directed to monitoring memory accesses by one or more processes that were commenced during processing of the object within the VM, injecting a transition event when an access to a page on which a Point of Interest (POI) is located, and performing one or more malware detection routines when a transition event is executed. The Points of Interest used to trigger the malware detection routines and the rules and/or parameters utilized during the malware detection routines may be updated (e.g., new POIs, rules and/or parameters added; POIs, rules and/or parameters deleted; POIs, rules and/or parameters modified) within the dynamic analysis engine 160 that contains the one or more VMs and a virtual machine monitor (VMM). The VMM manages processing in the VMs of received objects that are deemed to be "suspicious" when loaded into the dynamic analysis engine 160 for further analysis.

In one embodiment, as shown in FIG. 1, the MDS 100 may be an electronic device that is adapted to analyze information associated with incoming data (e.g., data over a transmission medium 112 that is part of the network 110). The incoming data may be directed from/to one or more endpoint devices (not shown) via any type of transmission medium 112, such as data routed via a wireless channel from a server, data routed via a wired cable coupled to the server or any device with storage capability, data routed via a combination of wired and wireless mediums, or the like. As in this illustrative embodiment, the network 110 may include a public network such as the Internet, a private network (e.g., a local area network "LAN", wireless LAN, etc.), or a combination thereof.

Although not shown, the MDS 100 may be communicatively coupled with the network 110 via an interface 114 operating as a data capturing device. According to one embodiment of the disclosure, the interface 114 is configured to receive the incoming data and provide information associated with the received incoming data to the MDS 100. For instance, the interface 114 may operates a network tap that provides at least one or more objects (hereinafter "object(s)") extracted from network traffic propagating over the transmission medium 112. Alternatively, although not shown, the MDS 100 may be configured to receive files or other objects that automatically (or on command), accessed from a storage system. As yet another alternative, the MDS 100 may be configured to receive objects that are not provided over the network 110. For instance, as an illustrative example, the interface 114 may be a data capturing device (e.g., port) for receiving objects manually provided via a suitable dedicated communication link or from portable storage media such as a flash drive.

Metadata may accompany the object(s) for analysis. According to one embodiment of the disclosure, the metadata may be used, at least in part, to determine protocols, application types and other information that identifies characteristics of the object under analysis. The metadata may be used by logic within the MDS 100 (e.g., the scheduler 140) to select one or more software (guest) images that correspond to a particular software profile. The software images are used to provision virtual machines $162_1$-$162_M$ (M≥1) within the dynamic analysis engine 160 according to a particular software profile. For instance, accessible by the scheduler 140, a plurality of different types of software images may be stored in a storage device 150, which correspond to a plurality of different types of software profiles. The software images can be updated via an external source (e.g., management system and/or cloud computing services) under a "push" or "pull" delivery scheme. These software images are used for configuring virtual machine(s) $162_1$-$162_M$ within the dynamic analysis engine 160.

In some embodiments, although not shown, interface 114 may be contained within the MDS 100. In other embodiments, the interface 114 can be integrated into an intermediary device in the communication path (e.g., a firewall, router, switch or other networked electronic device) or can be a standalone component, such as an appropriate commercially available network tap.

As further shown in FIG. 1, a first embodiment of the MDS 100 includes the processing engine 120, static analysis engine 130, scheduler 140, storage device 150, dynamic analysis engine 160, object classification engine 180, and reporting engine 190. Herein, according to one embodiment of the disclosure, the processing engine 120 receives a flow that features related information (e.g., data packets, etc.), including an object, and converts that object into a format, as need or appropriate, on which deep scanning by the static analysis engine 130 can be applied. This conversion and scanning may involve decompression of the object, decompilation of the object, extraction of specific data associated with the object, and/or emulation of the extracted data (like JavaScript).

The static analysis engine 130 may include processing circuitry, such as one or more processors for example, which features metadata capture logic and static analysis logic. For example, the metadata capture logic may extract and/or generating metadata contained with and/or associated with incoming data (e.g., network traffic). This metadata may be subsequently used for configuring one or more VMs $162_1$-$162_M$ within the dynamic analysis engine for processing the object associated with that metadata. In addition to, or in lieu of the metadata associated with the source of the object 145, it is contemplated that other types of metadata may be captured. For instance, these other types of metadata may include metadata associated with the destination (e.g., endpoint node or device on a network) targeted to receive the object 145. As examples, the metadata may include the device type or Media Access Control (MAC) address for the endpoint device, the particular software configuration of the endpoint device 130, or the like.

Referring still to FIG. 1, the static analysis logic 130 includes one or more software modules that, when executed by the controller(s), analyzes features for one or more incoming objects 145, which may be a portion of network traffic according to this embodiment of the disclosure. Such analysis may involve a static analysis of the features of each object under analysis to determine whether the object 145 is "suspicious," namely there exists a certain level of likelihood that the object 145 is associated with malware. This static analysis may include one or more checks being conducted on the object without its execution. Examples of the checks may include signature matching to conduct (a) exploit signature checks, which may be adapted to compare at least a portion of the object under analysis with one or more pre-stored exploit signatures (pre-configured and pre-determined attack patterns) from signature database (not shown), and/or (b) vulnerability signature checks that may be adapted to uncover deviations in messaging practices (e.g., noncompliance in communication protocols, message formats or ordering, and/or payload parameters including size). Other examples of these checks may include (i) heuristics, which are based on rules or policies as applied to the object and may determine whether one or more portions of the object under analysis is associated with an anomalous or suspicious characteristic (e.g., a particular URL associated with known exploits, or a particular source or destination address etc.) associated with known malware; or (ii) determinative rule-based analysis that may include blacklist or whitelist checking.

Upon static analysis of the features of the object 145, the static analysis engine 130 determines whether this object 145 is "suspicious," namely, the object 145 has features that suggest its association with a malicious attack. As a result, the static analysis engine 130 may route this suspicious object 148 (e.g., some or the entire analyzed object 145) to the dynamic analysis engine 160 for more in-depth analysis. More specifically, after analysis of the features of the object 145 has been completed, the static analysis engine 130 may provide the suspicious object 148 to the dynamic analysis engine 160 for in-depth dynamic analysis by VMs $162_1$-$162_M$.

Referring still to FIG. 1, according to one embodiment, the virtual machine monitor (VMM) 164 may be adapted to configure one or more VMs $162_1$-$162_M$, namely the first VM $162_1$ and the $M^{th}$ VM $162_M$ as shown, based on metadata associated with the suspicious object 148. For instance, the VMs $162_1$-$162_M$ may be provisioned with software images stored within the storage device 150. These software images are configured in accordance with certain software profiles. The software profiles may be directed to software components supplied by an enterprise and/or software components commonly utilized by endpoint devices within the enterprise (e.g., a certain version of Windows® OS; a certain version of a particular web browser such as Internet Explorer®; Adobe® PDF™ reader application; etc.). As yet another alternative embodiment, the software image may include a script that fetches the software components from a third party (e.g., software manufacturer, distributor, etc.). Of course, it is contemplated that the VM configuration described above may be handled by logic other than the virtual machine monitor (VMM) 164 such as a scheduler 140.

According to one embodiment of the disclosure, the dynamic analysis engine 160 may be adapted to execute one or more VMs $162_1$-$162_M$, which provides processing for the suspicious object 148. For instance, dynamic analysis engine 160 comprises the VMM 164, which is configured to instrument the one or more VMs $162_1$-$162_M$, handle exceptions via a memory violation handler 167 and a transition event exception handler 169, and inspect the application memory allocated for the one or more VMs $162_1$-$162_M$ via the virtual machine monitor inspection logic (VMMI) 166.

Information regarding the behaviors monitored by the VMs $162_1$-$162_M$ and/or the virtualized device hardware 168 may be stored within an event log 170 for subsequent transfer as part of the VM-based results 172 to the object classification engine 180.

According to one embodiment of the disclosure, the object classification engine 180 includes logic that is configured to receive the VM-based results 172, which include information associated with the monitored behaviors associated with processing of the suspicious object 148 with the VM(s) $162_1$, . . . , and/or $162_M$. Based on the VM-based results 172, the object classification engine 180 classifies the suspicious object 148 as malicious or not. According to one embodiment of the disclosure, the object classification engine 180 comprises prioritization logic, score determination logic, and comparison logic. The optional prioritization logic may be configured to apply weighting to analysis results 174 from the static analysis engine 130 (illustrated by dashed lines) and/or the VM-based results 172.

The score determination logic analyzes the VM-based results and determines (i) a probability (e.g., a score value) that the suspicious object 148 is associated with a malicious attack and/or (ii) a suspected severity of the malicious attack. The analysis may include correlation of the VM-based results with analysis results (behaviors) associated with known malware and benign objects, based on experiential knowledge and machine learning. The probability (score) may be included as part of the results provided to the reporting engine 190. According to one embodiment of the disclosure, the score determination logic may rely on a rule-based predictive model to determine the probability (score) and/severity assigned to the suspicious object 148. Such information may be used in reporting for ordering of alerts, determining the medium or mediums of transmission of the alerts from the reporting engine 190, the presentation style (font color, font size, selected image, etc.) used in generation of the alerts, or the like.

As shown in FIG. 1, the reporting engine 190 is configured to receive information from the object classification engine 180 and generate alerts. The alerts may include various types of messages that identify to a network administrator the suspicious object 148 as malicious. The message types may include text messages and/or email messages, video or audio stream, or other types of information over a wired or wireless communication path.

Figure 2:
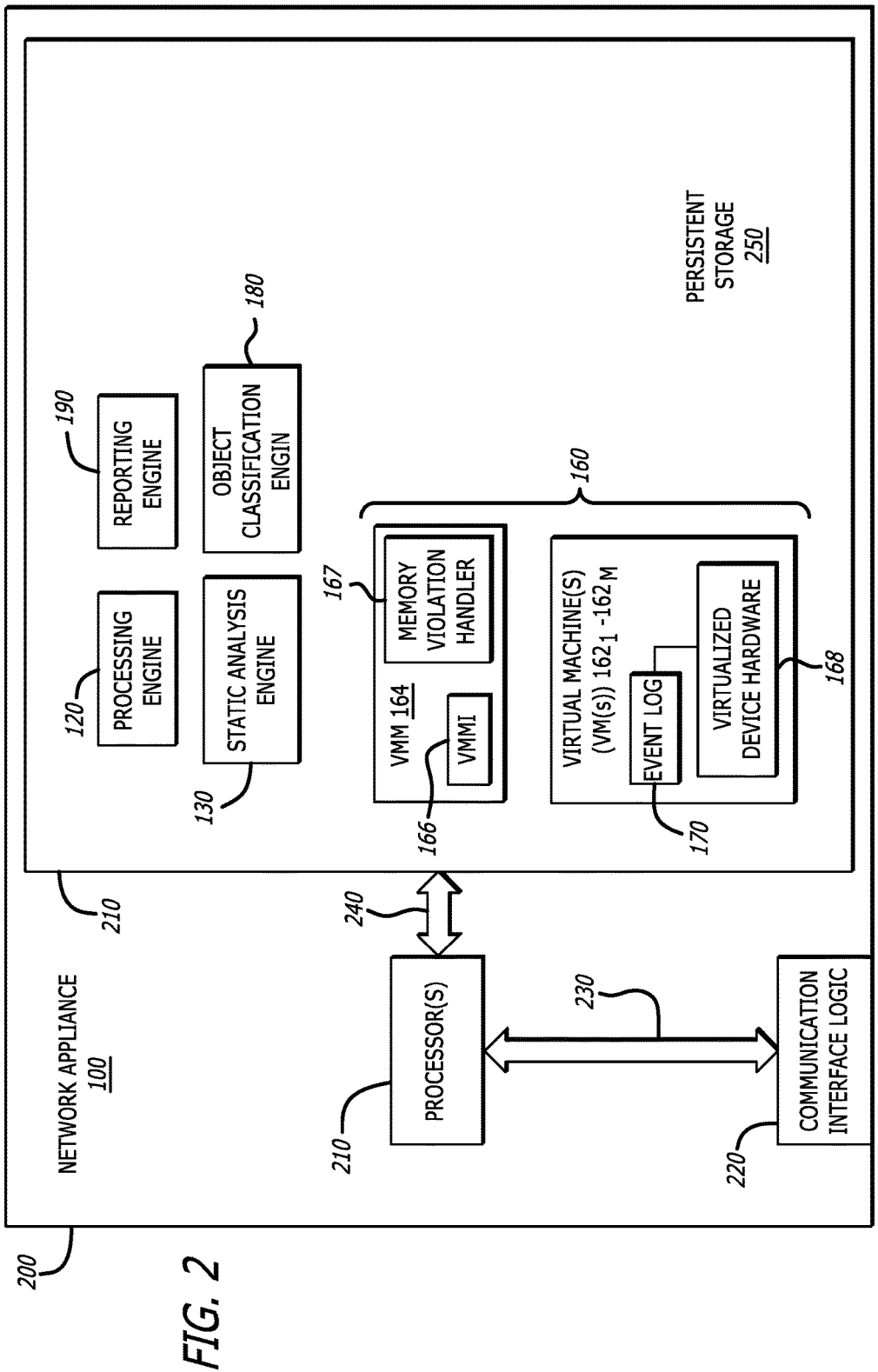
FIG. 2 is an exemplary embodiment of a logical representation of the malware detection system of FIG. 1.

Referring now to FIG. 2, an exemplary embodiment of a logical representation of the MDS 100 is shown. The MDS 100 includes a housing 200, which is made entirely or partially of a hardened material (e.g., hardened plastic, metal, glass, composite or any combination thereof) that protect circuitry within the housing 200, namely one or more processors 210 that are coupled to communication interface logic 220 via a first transmission medium 230. Communication interface logic 220 enables communications with external network devices and/or other network appliances to receive updates for the VMM 164. According to one embodiment of the disclosure, communication interface logic 220 may be implemented as a physical interface including one or more ports for wired connectors. Additionally, or in the alternative, communication interface logic 220 may be implemented with one or more radio units for supporting wireless communications with other electronic devices.

Processor(s) 210 is further coupled to persistent storage 250 via transmission medium 240. According to one embodiment of the disclosure, persistent storage 250 may include (a) processing engine 120; (b) static analysis engine 130; (c) the dynamic analysis engine 160, which includes one or more VMs $162_1$-$162_M$, the VMM 164, the VMMI 166, the memory violation handler 167 and the transition event exception handler 169; (d) object classification engine 180; and (e) reporting engine 190. Of course, when implemented as hardware, one or more of these logic units could be implemented separately from each other.

Collective logic within the dynamic analysis engine 160 may be configured to detect malware and/or exploits during processing of an object by one or more virtual machines through the use of permission switching techniques to halt processing at predetermined points of interest and perform malware detection routines on the state of the vCPU therein. The results of the malware detection routines performed on the state of the vCPU when an attempt to execute a point of interest occurs may improve the classification performed by the object classification engine 180 thereby enhancing overall performance of the MDS 100, as well as one or more endpoints 130.

III. Malware Detection Methodology Using the Transition Event Mechanism

Figure 3:
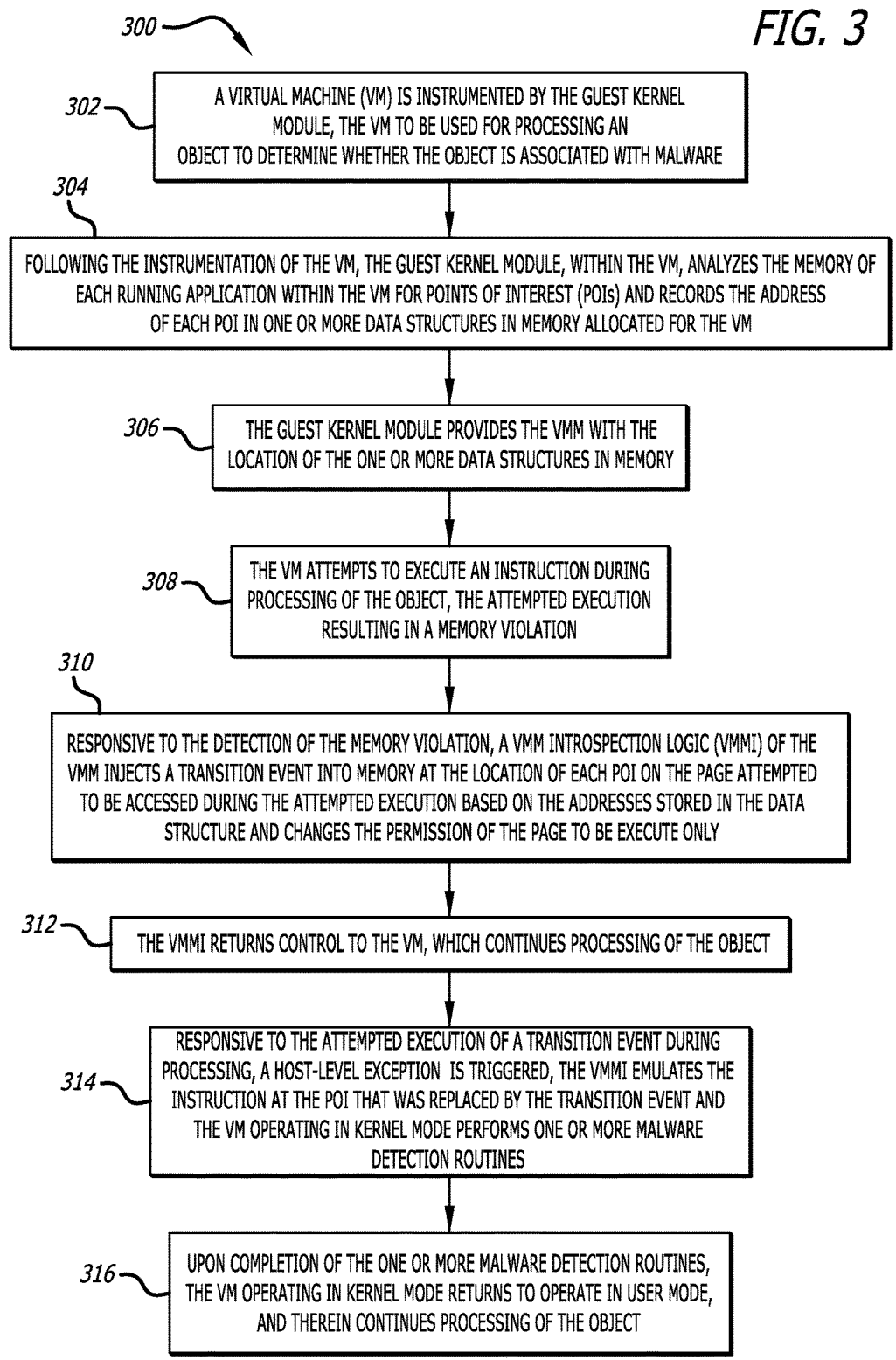
FIG. 3 is a flowchart illustrating an exemplary method for detecting malware through a permission switching technique using the malware detection system of FIG. 1.

Referring to FIG. 3, is a flowchart illustrating an exemplary method for detecting malware through a permission switching technique using the malware detection system of FIG. 1 is shown. Each block illustrated in FIG. 3 represents an operation performed in the method 300 of the permission switching technique. Referring to FIG. 3, a virtual machine is instrumented by a guest kernel module (block 302). The virtual machine and the VMM are both located within the dynamic analysis engine of the malware detection system 100 of FIG. 1, and the virtual machine is used for processing an object to determine whether the object is associated with malware. In one example, the object may be received via the network 110 as seen in FIG. 1.

At block 304, a guest kernel module within the VM analyzes the memory of each running application within the VM. The analysis detects an instruction at one or more points of interest located within the memory of each running application. As noted above, a point of interest is an address of an instruction of a predetermined sequence of instructions located in an OS or application function, the sequence of instructions predetermined as likely to be associated with malware. Additionally at block 304, the location of each POI is recorded in the one or more data structures. At block 306, the guest kernel module provides the VMM with the location in memory of the one or more data structures.

At block 308, the VM attempts to execute an instruction during processing of the object, wherein the attempted execution results in a memory violation, wherein the memory violation is an attempt to access (via execution of an instruction) a page in the memory allocated for the VM having a permission other than execute (e.g., allocated for a process within the VM). A memory violation handler detects the memory violation. In one embodiment, following the analysis of the application memory allocated for the VM, the VMMI sets the permission of each page in the memory allocated for the VM to be "read only". Thus, an attempt to execute an instruction located on a page in memory, wherein the page has a permission set to "read only", will trigger a memory violation exception.

At block 310, responsive to detecting the memory violation, a virtual machine monitor inspection logic (VMMI) injects a transition event into memory at each location of a POI located on the page attempted to be accessed. The location of each point of interest located on the page is determined by referencing the one or more data structures as discussed above. Additionally, the VMMI changes the permission of the page to "execute only". This change in permission is intended to hide malware detection from and encourage continued activity by advanced malware if present in the object. At block 312, following the injection of the transition event and the change of the permission of the page, the VMMI returns control to the VM, which continues processing the object.

At block 314, responsive to detecting an attempted execution of the transition event (representing a host-level exception), first, the processing is halted and control is transferred to the VMMI. The VMMI references the one or more data structures as discussed above to determine the original instruction indicated by) the POI that was replaced by the executed transition event and emulates the original instruction (i.e., processes without execution to obtain the resulting change of state that would be caused by the instruction if it were executed). Second, control is transferred back to the VM, now operating in kernel mode, through a guest-level exception. At that point in time, the VM performs one or more malware detection routines. For example, a malware detection routine may involve (i) heuristics, which are based on rules or policies as applied to the object and may determine whether one or more portions of the object under analysis is associated with an anomalous or suspicious characteristic (e.g., a particular URL associated with known malware, or a particular source or destination address etc.) associated with known malware; or (ii) a determinative rule-based analysis that may include blacklist or whitelist checking.

At block 316, upon completion of the one or more malware detection routines, the VM returns to operate in user mode and continues processing the object. In one embodiment, the VM continues execution of instructions of the process from the instruction immediately following the location at which the executed transition event is located. Furthermore, the state of the VM is such that the VM and the processes running therein do not know of the execution of the transition event, but instead the emulation of the instruction at the POI causes the VM and the processes running therein to interpret the process flow in a manner such that the instruction at the POI was executed natively, without VMM involvement. Specifically, in block 314, the VMMI emulated the instruction at the POI so that, if the object is associated with advanced malware, the advanced malware will not be able to detect a disruption in the flow of execution (e.g., because the advanced malware may expect the VM to be in a particular state following execution of the POI).

IV. Implementation of Transition Event Mechanism

Figure 4:
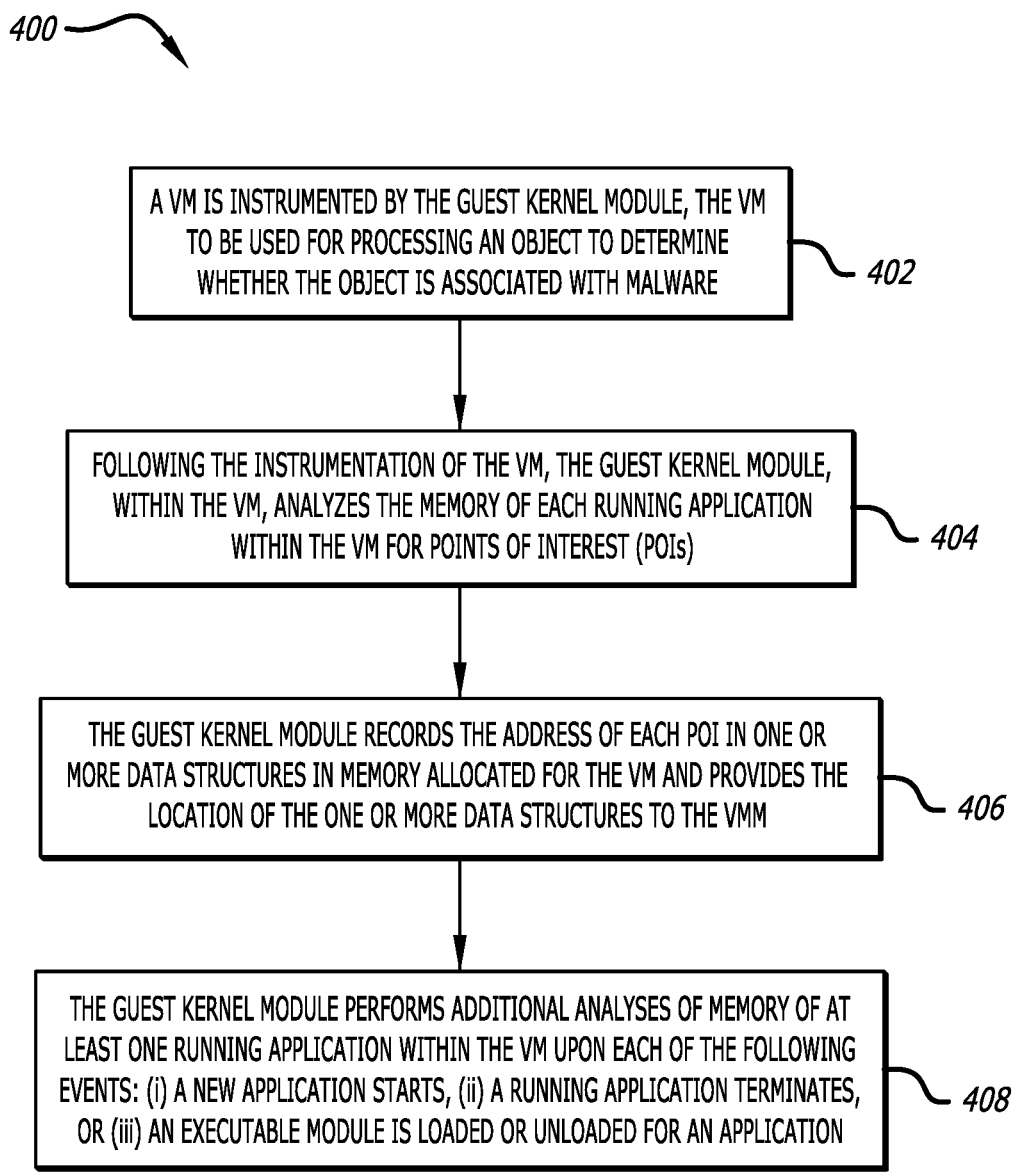
FIG. 4 is a flowchart illustrating an exemplary method for populating a shared allocated memory data structure of the malware detection system of FIG. 1.

Referring to FIG. 4, a flowchart illustrating an exemplary method for populating a data structure of the malware detection system of FIG. 1 is shown. Each block illustrated in FIG. 4 represents an operation performed in the method 400 of implementing a first portion of a malware detection process, the first portion involving populating a data structure of the VMM with the location of each POI within the memory allocated to a VM being monitored by the VMM. Referring to FIG. 4, a virtual machine (VM) is instrumented by the guest kernel module. The instrumentation is performed so that the VM may be used to process an object to determine whether the object is associated with malware (block 402). For example, the instrumentation may include provisioning the VM with a guest image, where the guest image is configured in accordance with a particular software profile. This particular software profile is dependent on the type of object being analyzed.

At block 404, following the instrumentation of the VM, a guest kernel module within the VM, analyzes the memory of each running application for one or more POIs. In one embodiment, the analysis of the memory of each running application may be based on analyzing a known structure of the operating system running within the VM. For example, a known structure of the operating system running within the VM may set forth the locations of modules (e.g., a collection of functions) within memory. Additionally, based on known structures of one or more modules (e.g., as a result of prior disassembly of the modules), offsets within a module of one or more functions (e.g., a software library) are known. Therefore, an analysis of the memory of each running application may include determining a POI (e.g., an address) based on a known structure of the applicable operating system and/or one or more known offsets of one or more functions likely to be associated with malware. At block 406, the guest kernel module records the address of each POI in one or more data structures in memory allocated for the VM. The guest kernel module subsequently provides the VMM with the location in memory of the one or more data structures.

At block 408, the guest kernel module performs additional analyses of one or more application memories allocated for the VM. For instance, the guest kernel module performs an analysis of an application memory of an application that was started following the initial analysis as discussed with respect to block 404. The guest kernel module may also analyze one or more application memories in response to the termination of a running application. Additionally, the guest kernel module may analyze the application memory of an application for which an executable module is loaded or unloaded. Upon completion of one or more of the additional analyses, the guest kernel module alters the one or more data structures as applicable (e.g., records the location of any new POIs detected or any POIs that have been moved, and/or deletes the location of any POIs that have been moved or deleted).

Figure 5A:
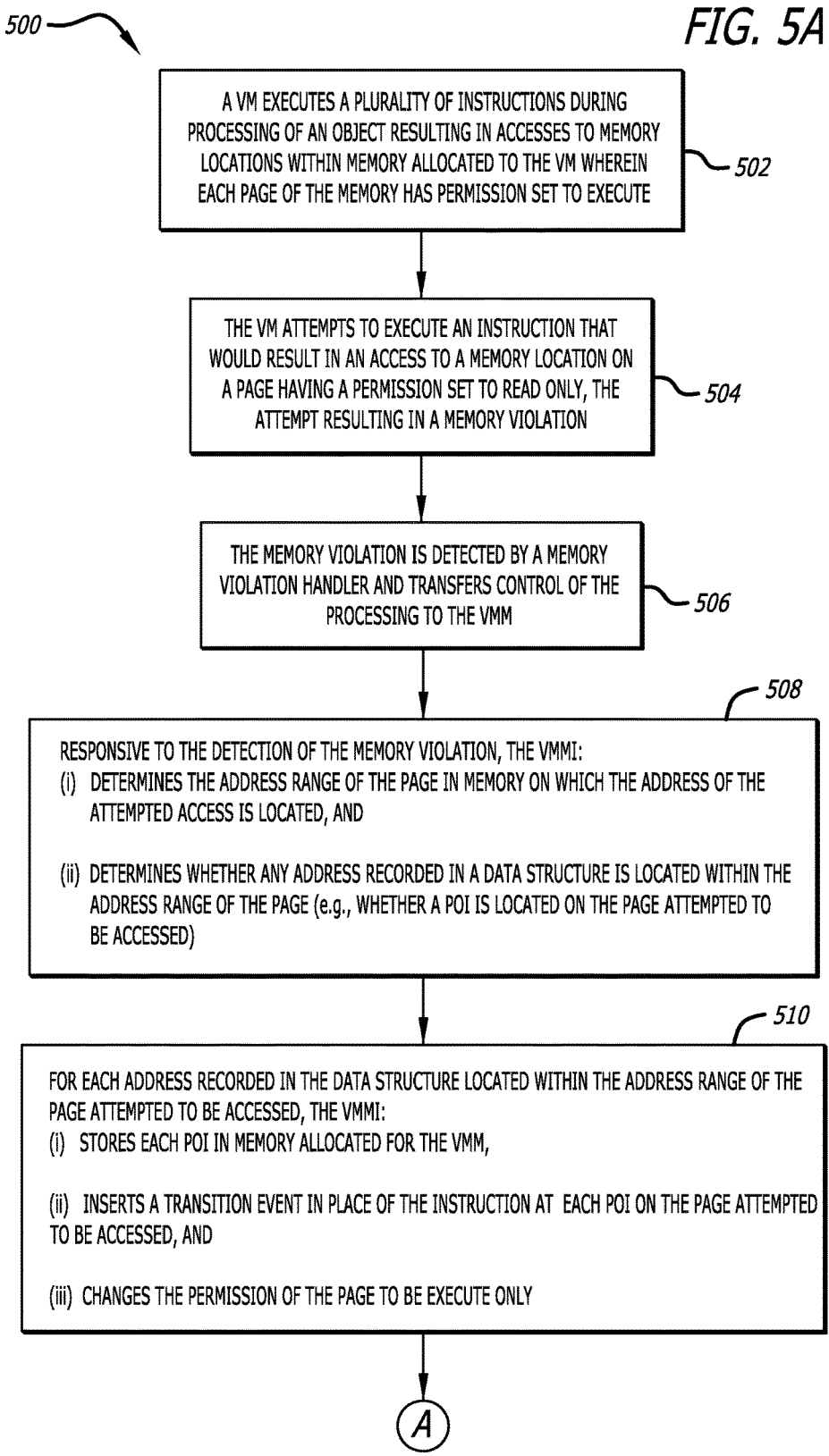
FIGS. 5A-5B represent a flowchart illustrating an exemplary method for detecting malware through implementing a transition event mechanism malware detection system of FIG. 1.
Figure 5B:
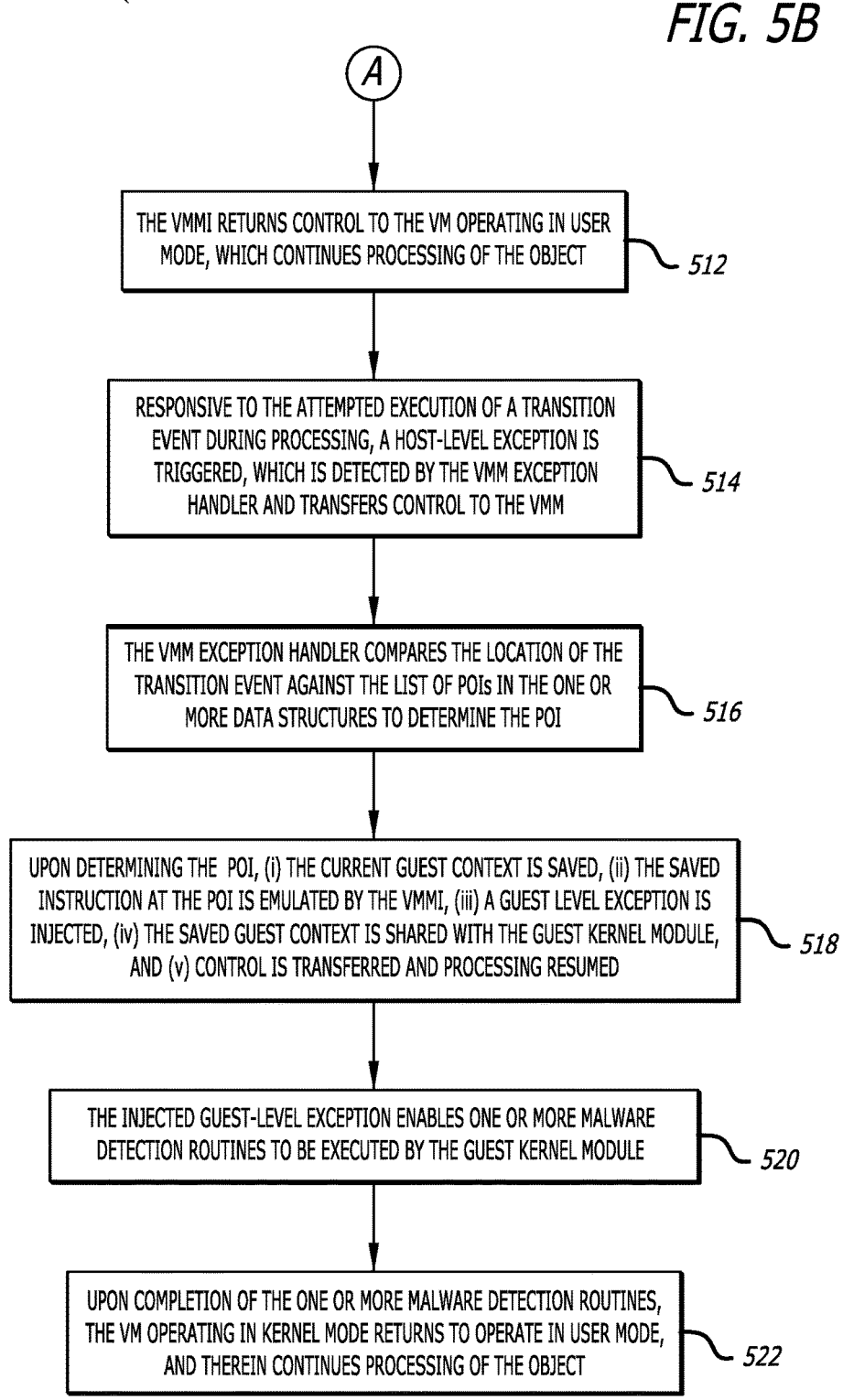

FIGS. 5A-5B represent a flowchart illustrating an exemplary method for detecting malware through implementing a transition event mechanism of the malware detection system of FIG. 1. Referring to FIG. 5A, a flowchart illustrating a first portion of an exemplary method for detecting malware through implementing a transition event mechanism malware detection system of FIG. 1 is shown. Each block illustrated in FIGS. 5A-5B represents an operation performed in the method 500 of detecting malware through implementing a transition event mechanism of the MDS 100. Referring to FIG. 5A, a virtual machine (VM) executes a plurality of instructions processing of an object within the VM resulting in accesses to memory locations within memory allocated to the VM wherein each page of the memory has a permission of Execute (block 502).

At block 504, the VM attempts to execute an instruction that would result in an access to a memory location on a page having a permission that does not include Execute (e.g., the permission may be "read only"). The attempted execution results in a memory violation. At block 506, the memory violation is detected by a memory violation handler, the detection and handling of the memory violation transfers control of the processing to the VMM. The memory violation may be located within the VMM and communicatively coupled to a virtual machine monitor introspection logic (VMMI), which may also be located within the VMM.

At block 508, responsive to the detection of the memory violation, the VMMI (i) determines the address range of the page in memory on which the address of the attempted access is located, and (ii) determines whether any address recorded in a data structure is located within the address range of the page (e.g., whether a POI is located on the page attempted to be accessed).

At block 510, for each address recorded in a data structure located within the address range of the page attempted to be accessed, the VMMI (i) stores each POI in memory allocated for the VMM (e.g., a data structure), (ii) inserts a transition event in place of each POI on the page attempted to be accessed, and (iii) changes the permission of the page to be "execute only".

Referring to FIG. 5B, a flowchart illustrating a second portion of the exemplary method for detecting malware as continued from FIG. 5A is shown. At block 512, the VMMI returns control of the processing to the VM operating in user mode, which continues processing of the object.

At block 514, responsive to the execution of a transition event during processing of the object, a host-level exception is triggered, which is detected by a transition event exception handler, located within the VMM, thereby once again transferring control to the VMM.

At block 516, the VMM exception handler compares the location of the transition event against the list of the addresses of the POIs set forth in the one or more data structures in order to determine the POI that was attempted to be executed.

At block 518, upon determining the POI that was attempted to be executed, (i) the current guest context is saved, (ii) the saved instruction at the POI is emulated by the VMMI, (iii) a guest-level exception is injected, (iv) the saved guest context is shared with the guest kernel module, and (v) control of the processing is transferred to the guest and processing is resumed at the guest-level exception.

At block 520, the guest level exception enables the VM operating in kernel mode to execute one or more malware detection routines based on the saved guest context and/or the state of the VM environment immediately prior to the attempted execution of the instruction at the POI. In one embodiment, a guest level exception may be a hardware exception that is a predetermined signal to the guest kernel module to execute one or more malware detection routines that also passes information regarding the context of the VM.

At block 522, upon completion of the one or more malware detection routines, the VM may return to operate in user mode, and therein continue processing of the object (e.g., continue execution of instructions following the injected transition event). In one embodiment, as set forth in FIG. 5B, the processing of the object (e.g., execution of the instructions, possibly in a sequential manner) continues. In such an embodiment, the results of the one or more malware detection routines may be transmitted to one or more network devices or management devices in a report and/or saved on a storage-device (possibly cloud storage). In an alternative embodiment, malware may be detected, or a strong indication of malware may be found, such that the processing of the object terminates and a report with the results of the one or more malware detection routines may be transmitted to one or more network devices or management devices and/or saved on a storage-device (possibly cloud storage).

Figure 6:
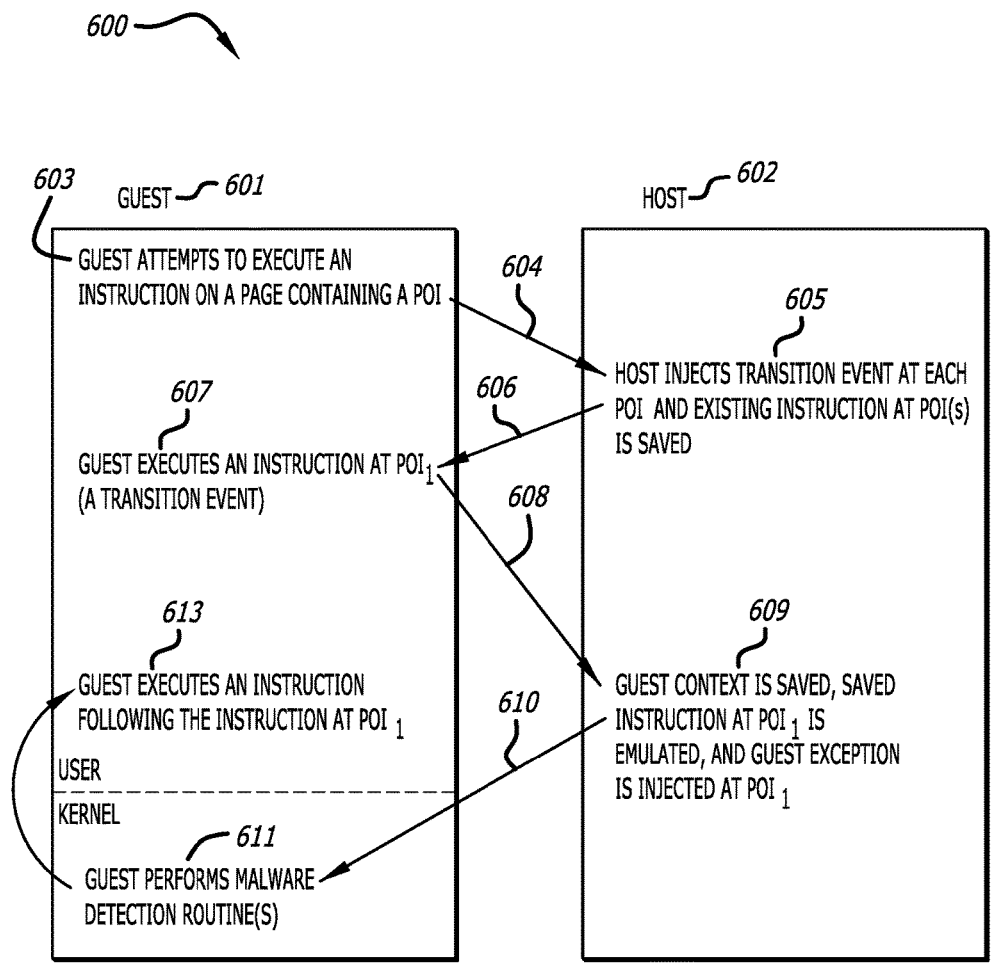
FIG. 6 is a block diagram illustrating an exemplary method for detecting malware through implementing a transition event mechanism malware detection system of FIG. 1.

Referring to FIG. 6, a block diagram illustrating an exemplary method for detecting malware through implementing a transition event mechanism malware detection system of FIG. 1 is shown. The diagram 600 includes a guest 601 and a host 602. Prior to the operations illustrated in FIG. 6, the address of each POI within application memory has been recorded in one or more data structures stored in memory allocated to the guest 601 and the permission of each page within the application memory has been set to "read only" by the VMM. During processing of an object within the guest operating in user mode, the guest attempts to execute an instruction on a page containing a POI (operation 603). The attempted execution of an instruction on a page containing a POI results in the triggering of a memory violation as the permission of the page is set to "read only" (exception 604). At operation 605, the host 602 injects a transition event at each POI location on the page attempted to be accessed, and the instructions corresponding to each of the POIs are saved. At 606, control of processing is transferred back to the guest and processing resumes. As used herein, the term "guest" may refer to a logical representation of a virtual machine, wherein the guest may be segmented into a user space and a kernel space. Additionally, the term "host" may refer to a logical representation of a virtual machine monitor. Herein, the term "virtual machine monitor" and "hypervisor" may be used interchangeably.

As the guest continues execution, the guest may execute a transition event located at $POI_1$ (operation 607). The location of $POI_1$ represents the location of the POI whose instruction was replaced with a transition event. The execution of the transition event results in the triggering of a transition event exception (608), which transfers control of the processing back to the host 602. As a result of the execution of the transition event exception, the host 602 saves the guest context (e.g., the state of the VM environment immediately preceding the execution of the transition event), the saved instruction previously located at $POI_1$ is emulated, and the a guest exception is injected at the location of $POI_1$ Following the emulation of the saved instruction located at $POI_1$ and the injection of the guest exception, control of the processing is transferred to the guest operating in kernel mode (610). At operation 611, the guest executes one or more malware detection routines. Upon completion of the one or more malware detection routines, the guest switches from operating in kernel mode to operating in user mode (612). At 613, the guest 601 continues processing of the object pursuant to the state of the VM altered by the emulation of the instruction previously located at $POI_1$ by executing an instruction following the location of $POI_1$ (e.g., the location at which the executed transition event was injected). As discussed above, the results of the one or more malware routines may be provided to one or more devices and/or stored in a storage device (e.g., a hard-drive storage device and/or cloud storage).

Figure 7:
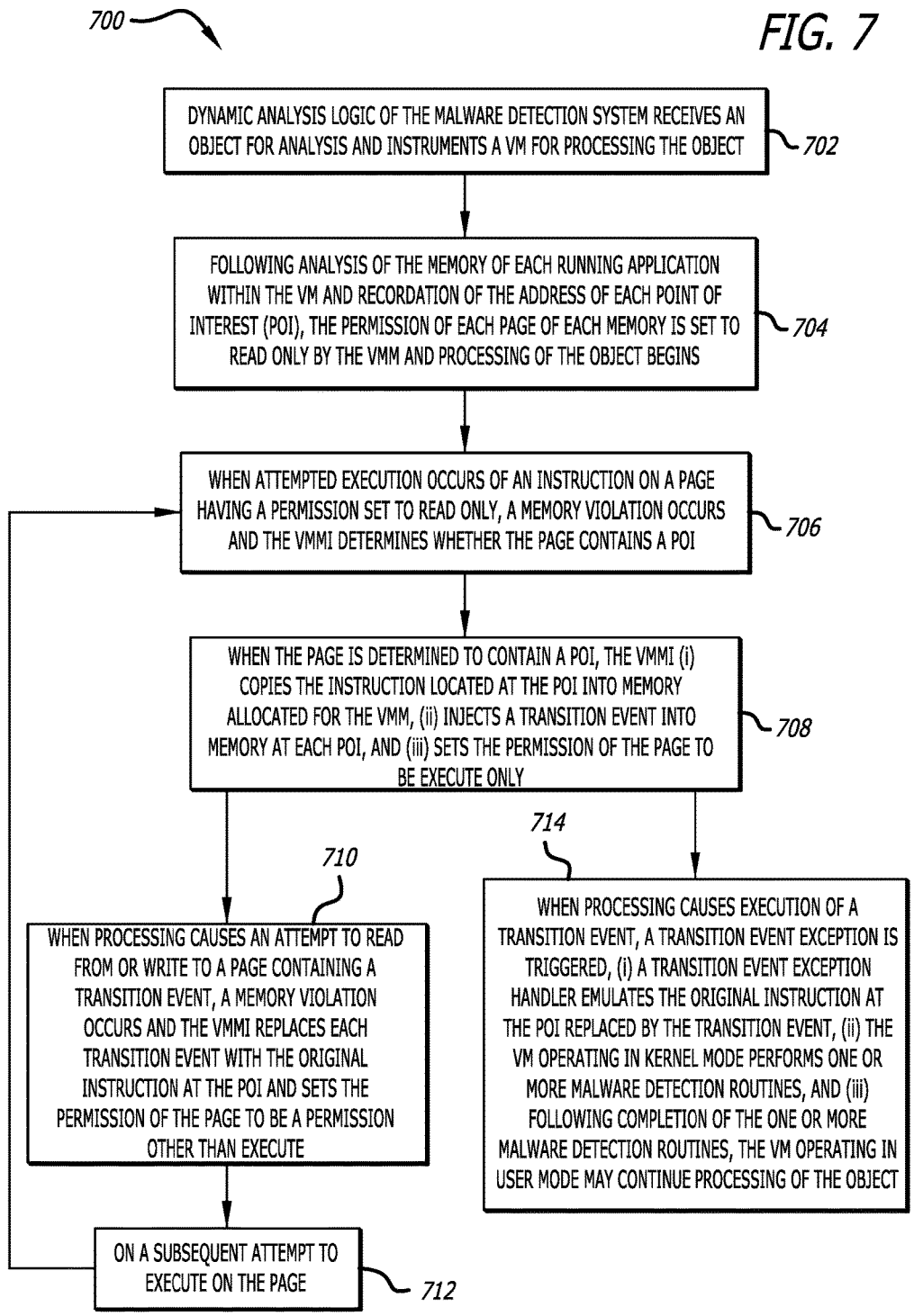
FIG. 7 is a flowchart illustrating an exemplary method for implementing a transition event mechanism of the malware detection system of FIG. 1.

Referring to FIG. 7, a flowchart illustrating an exemplary method for implementing a hypervisor mechanism of the malware detection system of FIG. 1 is shown. Each block illustrated in FIG. 7 represents an operation performed in the method 700 of implementing the transition event mechanism as used with the malware detection system. Referring to FIG. 7, the dynamic analysis logic of the malware detection system receives an object for analysis (block 702). At block 704, an analysis of the application memory allocated during instrumentation of a VM within the dynamic analysis logic and recordation of the location of each POI within one or more data structures in memory allocated to the VM, the permission of each page in the application memory is set to "read only" by the VMM and processing of the object begins.

At block 706, when an attempt to execute an instruction on a page in application memory wherein the permission of the page is set to "read only", a memory violation occurs and a VMMI within the VMM determines whether a POI is located on the page attempted to be accessed. At block 708, when the page includes one or more POIs, each POI is recorded in memory allocated for the VMM and a transition event is injected at the location of each POI. Additionally, the permission of the page is set to "execute only" and processing of the object continues.

At block 710, when processing of the object results in an attempt to read from, or write to, a page containing a transition event, a memory violation is triggered and the VMMI replaces the transition event with the original POI and sets the permission of the page to be a permission excluding Execute (e.g., Read and Write only, "read only", or Write only). At block 712, a subsequent attempt to execute on the page occurs and the method 700 returns to block 706.

At block 714, when processing in the VM results in execution of a transition event, a transition event exception is triggered. Responsive to the detection of the transition event exception, control of the processing is transferred to the VMM and the transition event exception handler saves the guest context, the VMMI emulates the original instruction previously located at the POI that was replaced by the executed transition event and injects a guest exception, which transfers control to the VM operating in kernel mode. The VM operating in kernel mode performs one or more malware detection routines. Following completion of the one or more malware detection routines, the VM returns to operating in user mode and continues processing the object.

Figure 8:
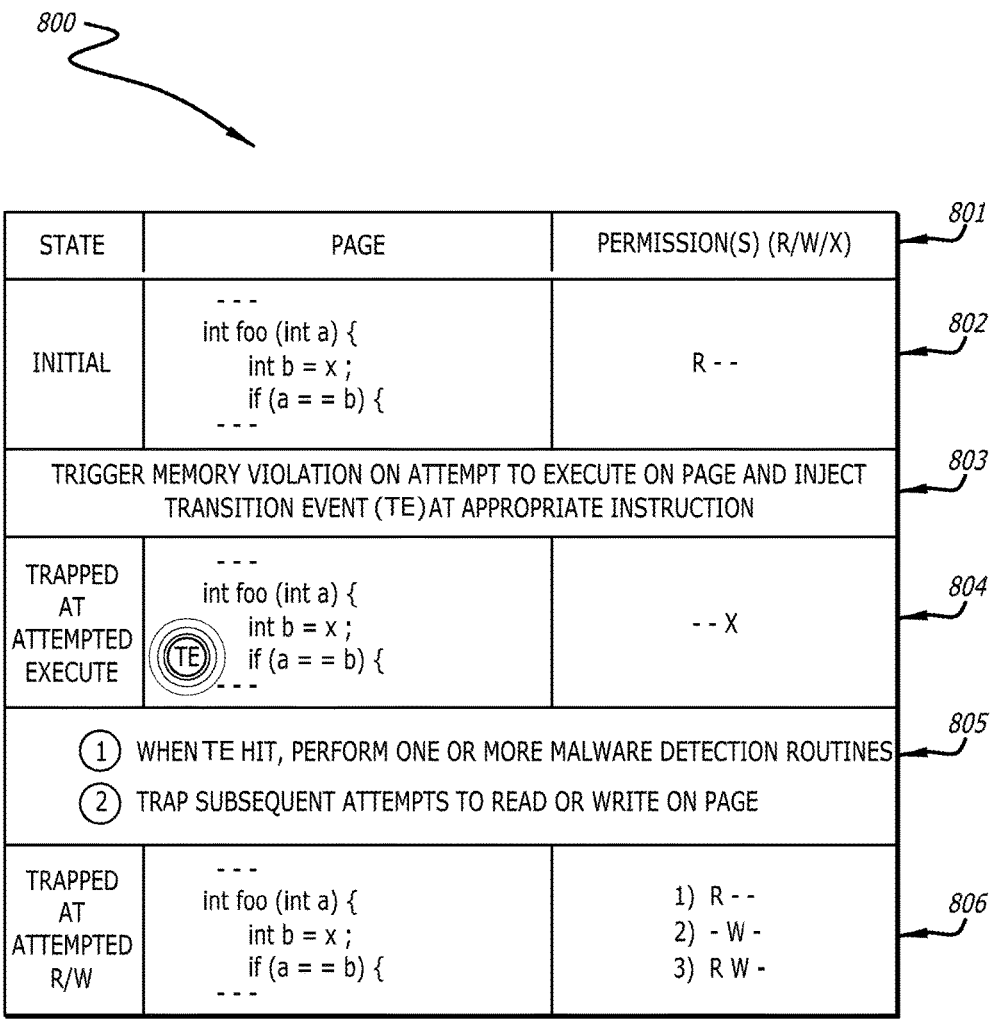
FIG. 8 is a block diagram illustrating an exemplary process of implementing a transition event mechanism of the malware detection method from within a dynamic analysis engine of a MDS is shown.

Referring to FIG. 8, a block diagram illustrating an exemplary process of implementing a transition event mechanism of the malware detection method from within a dynamic analysis engine of a MDS is shown. Diagram 800 includes six rows, rows 801-806. Row 801 serves as a header to the diagram and, as set forth, (i) the left-most column of rows 802, 804 and 806 represents the state of the execution; (ii) the center column of rows 802, 804 and 806 represents the relevant portion of the page under analysis in memory; and (iii) the right-most column 802, 804 and 806 represents the permission(s) of the page under analysis in memory, wherein "R/W/X" should be understood to represent permissions of "Read/Write/Execute."

Referring to row 802, the execution is in its initial stage, which implies that an attempted execution of the page has not been trapped and no transition events have been inserted or removed from the page. The center column of row 802 illustrates an exemplary portion of code of an application that is stored in memory on the page under analysis (FIG. 8 merely shows a sample portion of code and does not limit the disclosure to the code explicitly illustrated). The portion of code illustrated does not include a transition event. The right-most column indicates that the permissions of the page under analysis are set to "read only".

Referring to row 803, the MDS will trap the first attempt to execute on the page, determine whether the page includes at least one POI, and, if applicable, stores the POI in memory allocated for the VMM of the MDS and injects a transition event at the memory address at which the POI was located. In one embodiment, when a process is executing in a VM and the process attempts to execute an instruction on the page wherein the permissions of the page are set to "read only", a memory violation exception will be caught by a memory violation handler of the VMM. The execution of the process will be halted, without indicating such a halt to the process, and a VMMI of the VMM will determine whether the page includes at least one POI. As disclosed above, the POI may be one of a predefined set of instructions or functions that are known to likely be associated with malware and/or exploits. When the VMMI determines a POI is present on the page, the VMMI inserts a transition event into the memory at the location of the appropriate instruction (e.g., the POI) and sets the permissions of the page to be "execute only". Thereafter, control of the processing is returned to the VM and the process may continue to execute. As the process cannot read from the page, the process (if malware) cannot detect that a transition event has been injected.

Referring to row 804, the page under analysis is currently trapped (e.g., halted) at the attempted execution of an instruction on the page. The center column illustrates that a transition event has been injected at the location of the POI, (e.g., "if (a==b)") and the right-most column indicates that the permissions have been set to ""execute only"."

Referring to row 805, in the first scenario (i.e., when a transition event is hit), the processing is again halted, the instruction previously located at the POI is emulated by the VMMI and one or more malware detection routines are performed to determine whether the processing of the object is associated with malware and/or an exploit. In the second scenario (i.e., when the execution of the object results in an attempt to read or write to the page (e.g., the page now containing a transition event)), the processing is halted, the transition event is removed and the permissions of the page are set to one of (i) "read only"; (ii) "Write only"; or (iii) "Read and Write only," (e.g., a permission other than "execute only").

Referring to row 806, the page under analysis is currently trapped (e.g., processing halted) at the attempted read from or write to the page (e.g., second scenario). The center column illustrates that the transition event previously inserted at the instruction, "if (a==b)," has been removed and the right-most column indicates that the permissions have been set to one of (i) "read only"; (ii) "Write only"; or (iii) "Read and Write only" (e.g., a permission other than "execute only").

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon instructions, the instructions being executable by one or more processors to perform operations including:

instantiating a virtual machine (VM) with a virtual machine monitor (VMM), the VM to process an object to determine whether the object is associated with malware;

performing a first analysis of memory allocated for the VM for a point of interest (POI), the point of interest being an address an instruction of a set of instructions likely to be associated with malware, the set of instructions including one or more instructions;

detecting a memory violation during processing of the object, the memory violation being an attempt to access a page in the memory allocated for the VM having a permission other than "execute" from which a process running within the VM is attempting to execute;

responsive to detecting the memory violation, injecting a transition event at the point of interest on the page and setting the permission of the page to "execute only"; and responsive to continuing the processing of the object and detecting an attempted execution of the transition event, (i) emulating the instruction of the set of instructions corresponding to the point of interest, and (ii) performing one or more malware detection routines.

2. The storage medium of claim 1, wherein the transition event is one of an interrupt, a hardware event, or a privileged instruction, and the execution of the transition event transfers control from the VM to the VMM.

3. The storage medium of claim 1, wherein the first analysis includes determining the POI based on a known structure of an operating system running in the VM and one or more known offsets of each of the set of instructions likely to be associated with malware.

4. The storage medium of claim 1, wherein the memory allocated for the VM is analyzed by a guest kernel module of the VM.

5. The storage medium of claim 1, wherein the memory violation is detected by a memory violation handler of the VMM.

6. The storage medium of claim 1, wherein the transition event is injected by a virtual machine monitor introspection logic (VMMI) of the VMM.

7. The storage medium of claim 1, wherein the point of interest is emulated by the VMMI.

8. The storage medium of claim 1, wherein the one or more malware detection routines are performed by the VM operating in kernel mode.

9. The storage medium of claim 1, wherein the instructions being executable by the one or more processors to perform operations further including:
responsive to completion of the one or more malware detection routines, continuing processing of the object by the VM operating in user mode.

10. The storage medium of claim 1, wherein the instructions being executable by the one or more processors to perform operations further including:
populating one or more data structures with each point of interest detected during the first analysis of the memory allocated for the VM.

11. The storage medium of claim 1, wherein the instructions being executable by the one or more processors to perform operations further including:
performing a second analysis of at least a portion of the memory allocated for the VM when: (i) a new application is launched within the VM, (ii) a running application within the VM terminates, or (iii) an executable module is loaded or unloaded for an application running within the VM.

12. An electronic device comprising:
one or more processors;
a storage device communicatively coupled to the one or more processors and storing logic, the logic being executable by the one or more processors to perform operations including:
instrumenting a virtual machine (VM) with a virtual machine monitor (VMM), the virtual machine to process an object to determine whether the object is associated with malware;
performing a first analysis of memory allocated for the VM for a point of interest (POI), the point of interest being an address of an instruction of a set of instructions likely to be associated with malware, the set of instructions including one or more instructions;
detecting a memory violation during processing of the object, the memory violation being an attempt to access a page in the memory allocated for the VM having a permission other than "execute" from which a process running within the VM is attempting to execute;
responsive to detecting the memory violation, injecting a transition event at the point of interest on the page and setting the permission of the page to "execute only"; and
responsive to continuing the processing of the object and detecting an attempted execution of the transition event, (i) emulating the instruction corresponding to the point of interest, and (ii) performing one or more malware detection routines.

13. The electronic device of claim 12, wherein the transition event includes at least one of an interrupt or a privileged instruction, and the execution of the transition event transfers control from the VM to the VMM.

14. The electronic device of claim 12, wherein the first analysis includes determining the POI based on a known structure of an operating system running in the VM and one or more known offsets of the set of instructions likely to be associated with malware.

15. The electronic device of claim 12, wherein the transition event is injected by a virtual machine monitor introspection logic (VMMI) of the VMM.

16. The electronic device of claim 12, wherein the point of interest is emulated by the VMMI.

17. The electronic device of claim 12, wherein the one or more malware detection routines are performed by the VM operating in kernel mode.

18. The electronic device of claim 12, wherein the instructions being executable by the one or more processors to perform operations further including:
responsive to completion of the one or more malware detection routines, continuing processing of the object by the VM operating in user mode.

19. A method for detecting whether an object is associated with malware through processing of the object within a virtual machine (VM), the method comprising:
instrumenting the VM with a virtual machine monitor (VMM);
performing a first analysis of memory allocated for the VM for a point of interest (POI), the point of interest being an address of an instruction of a set of instructions likely to be associated with malware, the set of instructions including one or more instructions;
detecting a memory violation during processing of the object, the memory violation being an attempt to access a page in the memory allocated for a process within the VM having a permission other than "execute" from which a process running within the VM is attempting to execute;
responsive to detecting the memory violation, injecting an transition event at the point of interest on the page and setting the permission of the page to "execute only"; and
responsive to continuing the processing of the object and detecting an attempted execution of the transition event, (i) emulating the instruction corresponding to the point of interest, and (ii) performing one or more malware detection routines.

20. The method of claim 19, wherein the transition event includes at least one of an interrupt or a privileged instruction, and the execution of the transition event transfers control from the VM to the VMM.

21. The method of claim 19, wherein the first analysis includes determining the POI based on a known structure of an operating system running in the VM and one or more known offsets of the set of instructions likely to be associated with malware.

22. The method of claim 19, wherein the transition event is injected by a virtual machine monitor introspection logic (VMMI) of the VMM.

23. The method of claim 19, wherein the point of interest is emulated by the VMMI.

24. The method of claim 19, wherein the one or more malware detection routines are performed by the VM operating in kernel mode.

25. The electronic device of claim 19, wherein the instructions being executable by the one or more processors to perform operations further including:

responsive to completion of the one or more malware detection routines, continuing processing of the object by the VM operating in user mode.

26. A method for detecting whether an object is associated with malware through processing of the object within a virtual machine (VM), the method comprising:

performing a first analysis of memory allocated for the VM for one or more first points of interest (POIs), each point of interest being an address of an instruction of a set of instructions likely to be associated with malware, the set of instructions including one or more instructions;

recording each of the one or more points of interest in one or more data structures in memory shared between the VM and a virtual machine monitor (VMM); and performing a second analysis of at least a portion of the memory allocated for a process within the VM for one or more second points of interest, the second analysis being performed in response to any of the following: (i) a new application starts within the VM, (ii) a running application within the VM terminates, or (iii) an executable module is loaded or unloaded for a running application within the VM, and each of the one or more second points of interest are recorded in the one or more data structures;

injecting, by a virtual machine monitor introspection logic (VMMI), a transition event into a page of the memory allocated for the VM upon referencing the one or more data structures and setting a permission of the page to "execute only" in response to detection of a memory violation during processing of the object; and responsive to the processing the object and detecting an attempted execution of the transition event, (i) emulating the instruction corresponding to a point of interest of either the first points of interest or the second points of interest, and (ii) performing one or more malware detection routines.

27. The method of claim 26 further comprising:

instrumenting the VM with a software profile, the software profile including one or more applications, wherein the first analysis includes analyzes memory for each running application within the VM.

28. The method of claim 26, wherein the first analysis and the second analysis are performed by a guest kernel module located within the VM.

29. The method of claim 26 wherein the transition event includes at least one of an interrupt or a privileged instruction, and the execution of the transition event transfers control from the VM to the VMM.

* * * * *